No. 855,247. PATENTED MAY 28, 1907.
J. J. HURT.
AGRICULTURAL IMPLEMENT.
APPLICATION FILED MAR. 28, 1907.

5 SHEETS—SHEET 1.

Witnesses
Edwin L. Bradford
C. B. Clark

Inventor
Joel J. Hurt
By A. O. Behel
Attorney

No. 855,247. PATENTED MAY 28, 1907.
J. J. HURT.
AGRICULTURAL IMPLEMENT.
APPLICATION FILED MAR. 28, 1907.

5 SHEETS—SHEET 2.

WITNESSES:
C. B. Clark
E. Behel.

INVENTOR
Joel J. Hurt.
BY A. O. Behel
ATTORNEY

No. 855,247. PATENTED MAY 28, 1907.
J. J. HURT.
AGRICULTURAL IMPLEMENT.
APPLICATION FILED MAR. 28, 1907.

5 SHEETS—SHEET 3.

No. 855,247. PATENTED MAY 28, 1907.
J. J. HURT.
AGRICULTURAL IMPLEMENT.
APPLICATION FILED MAR. 28, 1907.
5 SHEETS—SHEET 4.
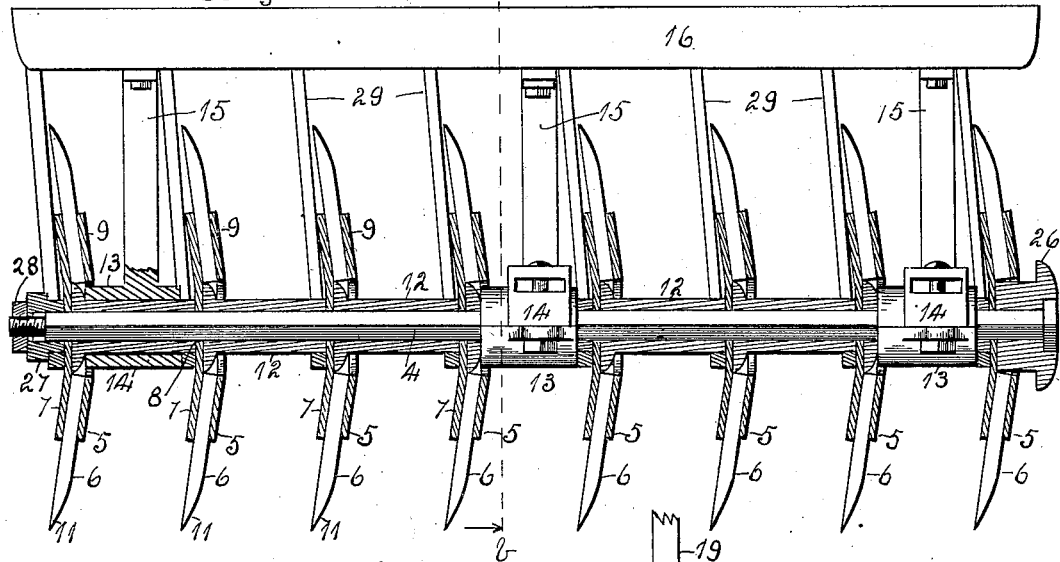
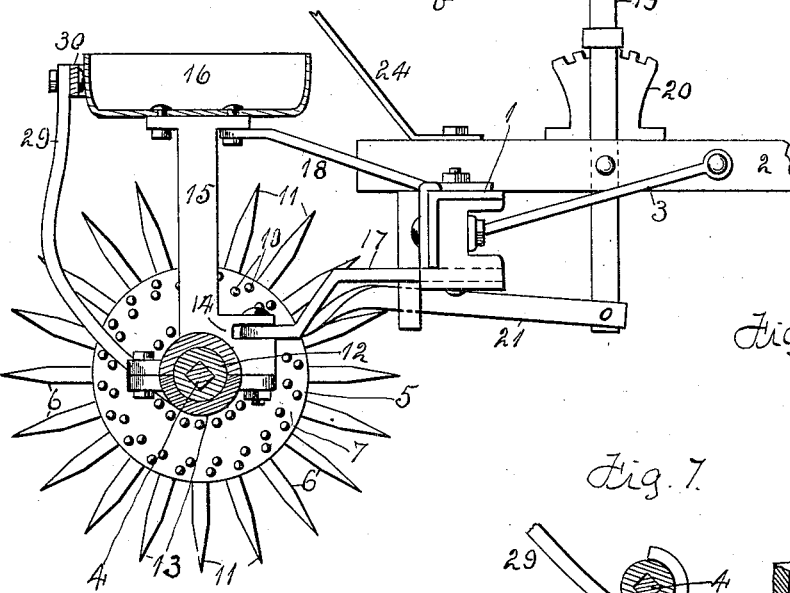
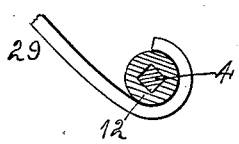
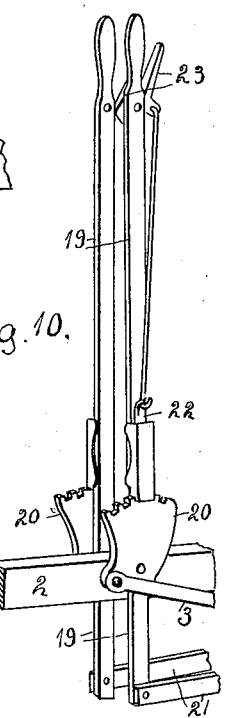
Witnesses
C. B. Clark
E. Behel
Inventor
Joel J. Hurt
By A. O. Behel
Attorney No. 855,247. PATENTED MAY 28, 1907.
J. J. HURT.
AGRICULTURAL IMPLEMENT.
APPLICATION FILED MAR. 28, 1907.

5 SHEETS—SHEET 5.

Witnesses
C. B. Clark
E. Behel.

Inventor
Joel J. Hurt
By A. O. Behel
Attorney

UNITED STATES PATENT OFFICE.

JOEL J. HURT, OF SOUTH OMAHA, NEBRASKA, ASSIGNOR TO EMERSON MANUFACTURING COMPANY, OF ROCKFORD, ILLINOIS.

AGRICULTURAL IMPLEMENT.

No. 855,247.

Specification of Letters Patent.

Patented May 28, 1907.

Application filed March 28, 1907. Serial No. 364,966.

*To all whom it may concern:*

Be it known that I, JOEL J. HURT, a citizen of the United States, residing at South Omaha, in the county of Douglas and State of Nebraska, have invented certain new and useful Improvements in Agricultural Implements, of which the following is a specification.

This invention has reference to an implement more particularly adapted for the renovation of alfalfa, although it possesses features which render it desirable for the renovation of various other crops.

In the renovation of alfalfa it is extremely desirable not only to thoroughly loosen the soil for a suitable depth to admit air, light and moisture, but at the same time to destroy all weeds, loosen up the alfalfa stools and remove the dead shells incasing the roots of the alfalfa stalks.

Figure 1:
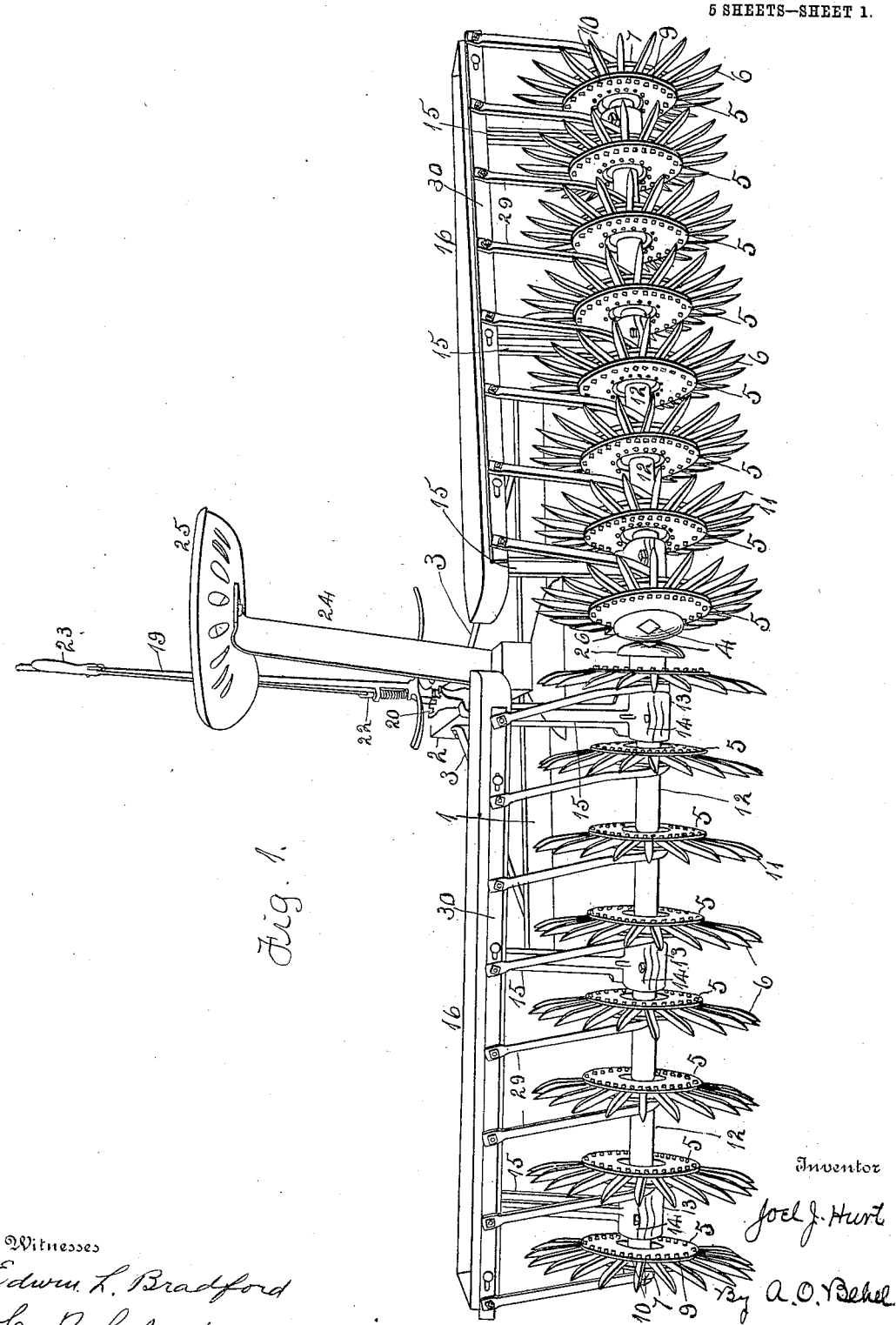
Figure 2:
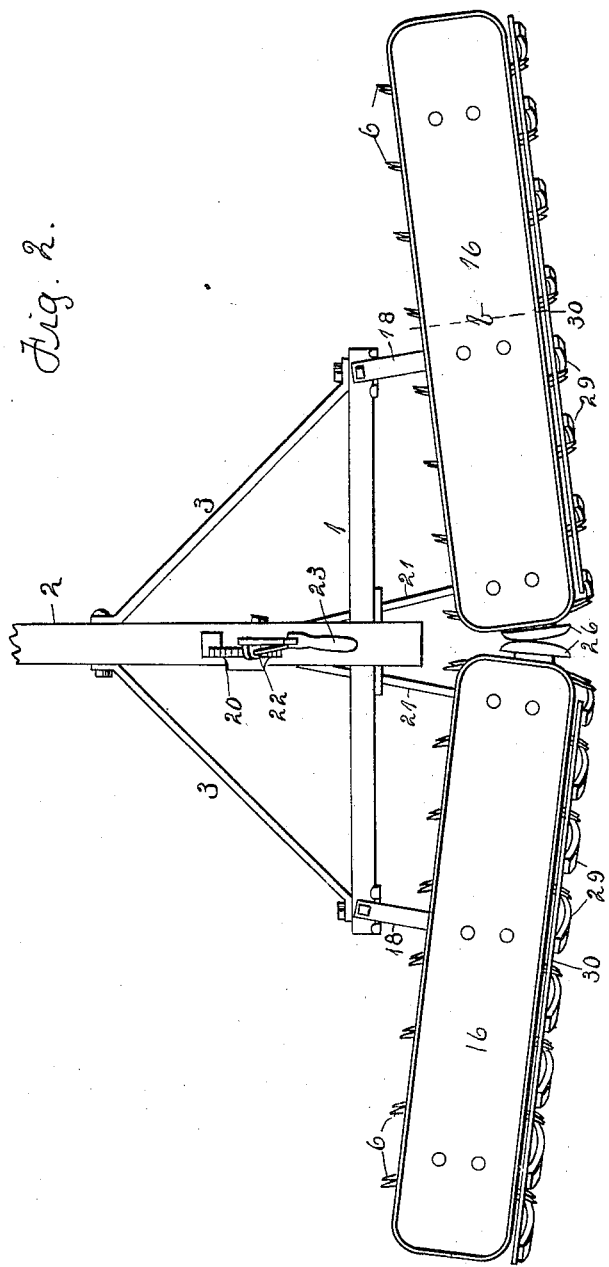
Figure 3:
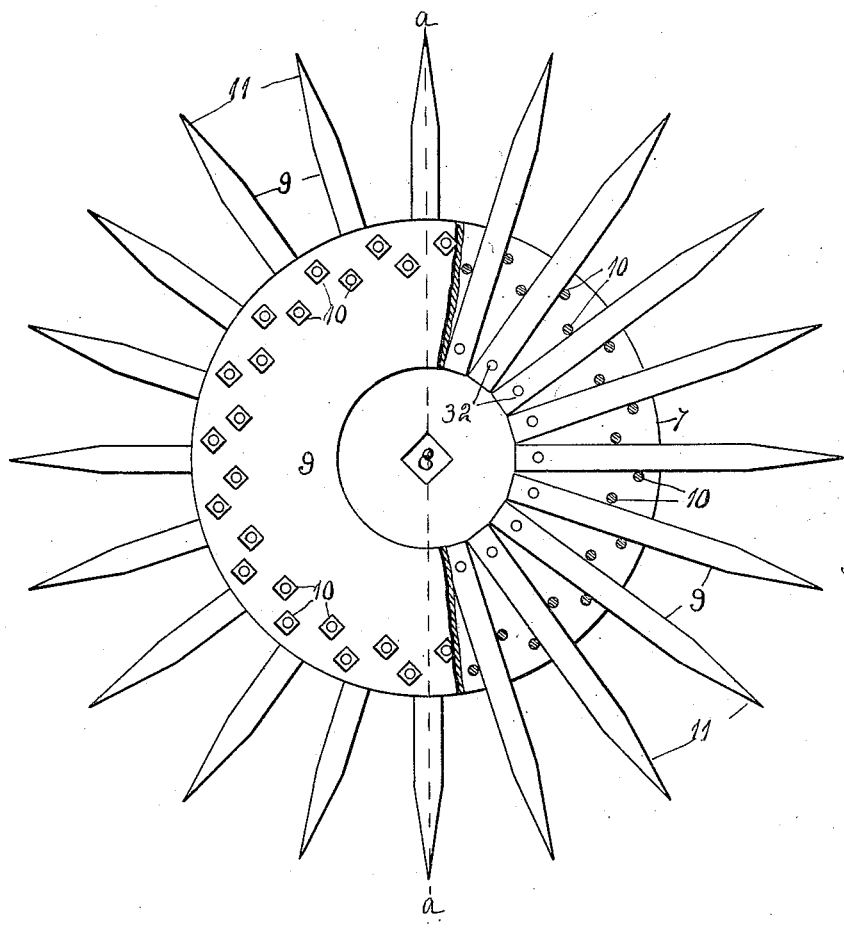
Figure 4:
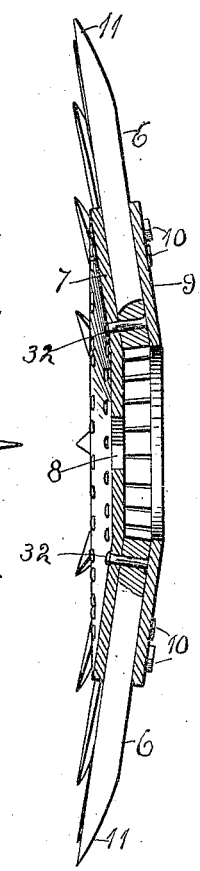
Figure 8:
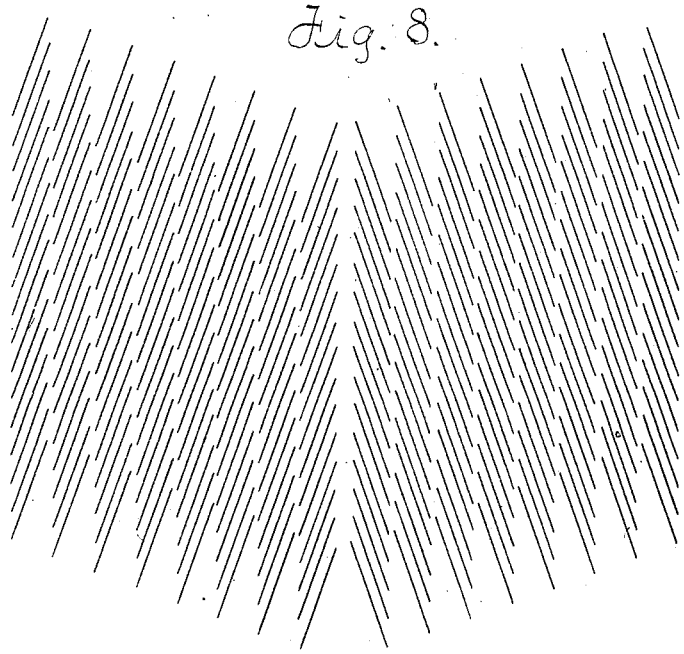
Figure 9:
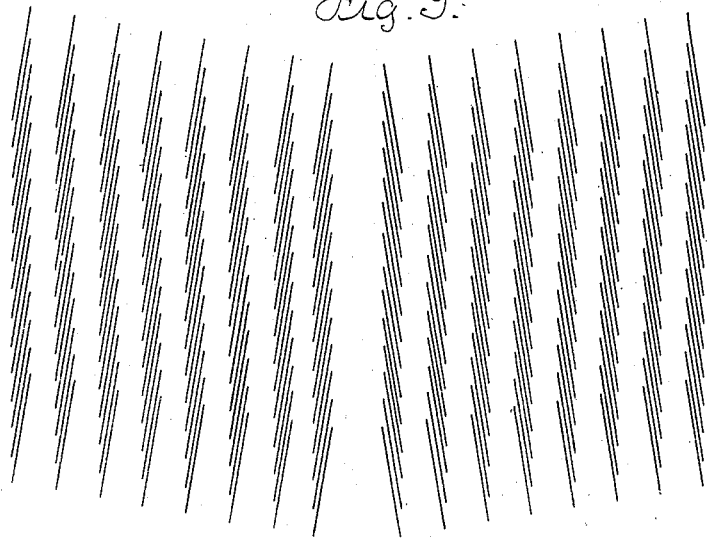

The implement hereinafter more particularly described, is not only capable of breaking and disintegrating the soil to a desirable depth without overturning or otherwise disturbing its strata, but will positively destroy all weeds and loosen up the alfalfa stools, without destroying the roots of the plants, thereby materially increasing the yield without in any way injuring the plants.
For a full description of the invention herein and the merits thereof, and complete knowledge of the details of construction of the preferred means for effecting these results, reference is had to the following description and the drawings hereto attached, in which—:

Figure 1 is a perspective view of my improved implement as the same appears when viewed from the rear. Fig. 2 is a plan view of the same implement. Fig. 3 is an enlarged face view of one of the heads in which one of the plates which goes to make up the head is broken away, to illustrate the mode of securing the teeth thereto. Fig. 4 is a cross-section as the same would appear on the line *a* of Fig. 3. Fig. 5 is a cross-section through the frame of the implement on dotted lines *b* Figs. 1 and 6 showing in elevation one of the heads and its teeth and also a scraper; one of such scrapers being employed in connection with the teeth of each head. Fig. 6 is a vertical and longitudinal section through one of the sections, illustrating the manner of carrying and spacing the heads on their carrying rods or shafts and a scraper coöperating with the teeth of the head. Fig. 7 is a cross-section of a spool and shaft showing the lower end of a scraper in connection with the spool. Figs. 8 and 9 are diagrammatic plan views illustrating the action of the teeth of my implement in the soil when the said implement is in action. Fig. 8 showing parallel serrations which are produced in the soil by the successive teeth of the successive heads, when the two series of heads have been adjusted to extreme angles, being preferably the position the parts would be in when working in a hard and dry soil; while in Fig. 9 the serrations are produced in the soil when the axial supports of the two sets of teeth carrying heads are almost in axial alinement, the parts being preferably in such a position when working in soil which is very moist. Fig. 10 is a perspective view of the double hand levers for moving the sections.

Like numerals of reference denote corresponding parts throughout the figures.

In the drawings, the main frame consists preferably of an angle-iron bar 1, to which the rear end of a pole or tongue 2 is suitably secured and braced by means of the brace rods 3 which are secured at one end to the pole or tongue and their outer ends suitably connected to the outer ends of the bar 1.

The machine comprises in its construction two sections which are so mounted as to be capable of adjustment, whereby the separate sections may be arranged at suitable angles with respect to each other and to the line of draft. Therefore, it is believed that inasmuch as the two sections are identical, the description of one section will suffice for the two.

4 denotes carrying rods or shafts, square in cross-section, and mounted to rotate with said rods a plurality of heads 5 to which are secured a plurality of teeth 6. The heads 5 consist preferably of a disk 7 provided with a central square opening 8 to enable the carrying of the disks on the rod 4 so as to positively fix the same to rotate with said rods. The disks 7 are preferably concave in a radial direction as shown in Fig. 4 and to the concave face of such disks are secured a plurality of teeth 6 square in cross-section. The teeth are fixedly secured to the disks 7, by riveting the inner ends of the same to the disks, as shown at 32 in Figs. 3 and 4; and a ring 9, see Fig. 3, is placed over the inner ends of the said teeth and secured to the disks 7 by means of bolts 10 which are located on each side of the respective teeth of the disks. The bolts 10 serve to connect the rings and disks and hold the teeth, so that each head, comprising a disk and ring, may be rotated by a force exerted against the teeth. The disks 7 are described as concave, and it is preferable, as shown in Fig. 4, that the teeth 6 shall continue in the same direction, or continue the concavity for a purpose to be described. The work required to be done by an implement of this character, demands that the teeth be heavy and strong, in order that they may penetrate the ground, and as shown, the teeth have pointed ends 11 to enable them to more easily enter the ground.

The heads 5 are suitably held in laterally spaced relation on their carrying rods or shafts 4 by means of short spools 12 which are arranged intermediate each of the disks 7 comprising said heads, one end of each of said spools 12 extending through the rings 9 as seen in Fig. 6.

Around the spools 12 which are located or rather disposed intermediate the two outer heads 5 of each of the sections are located boxes preferably made in the form of two half sections 13 and 14, somewhat as shown at Figs. 1 and 6 and bolted together; this is also true of the central spool 12 of each series, see Fig. 1. The upper half sections 14 have the upwardly extended supports 15, which may form a part of or be attached to the said sections, and said supports have secured to their upper ends a weight box or frame 16.

The connection between the bar 1 of the main frame and the rods or shafts 4 is through bars 17 connected at their forward ends to the bar 1 which have their rear ends pivotally connected to the central sections 14 around the spools 12 of each of the series, heretofore referred to as composed of the sections 13 and 14, see Figs. 1 and 5. To the frame 1 are connected bars 18 which extend rearward therefrom and connect with the supports 15 of the central boxes embracing the central spools 12.

The connection just described between the bars 17 and the central sections 14 around the spools 12 form the fulcrum point or pivotal connection on which may be oscillated each of the shafts 4 and the heads 5 of each of the series, for the purpose of changing the angle at which the teeth of the several heads shall penetrate the soil.

The manner of swinging or oscillating each section and the series of heads thereof is as follows; 19 indicates a hand lever which is pivotally connected to the pole 2. A toothed segment 20 is supported on the tongue or pole 2, and the lower end of said lever extends down below the said tongue or pole and has attached thereto the forward ends of a pair of bars 21, which are similar to the bars 17 in that their inner ends are connected to the sections 14 of the boxes surrounding the shafts 12 and disposed between the two heads of each of the series of heads, on the inner ends of the rods 4. Thus it will be seen, that upon shifting or throwing the lever 19 through the bars 21, the shafts 4 with their series of heads may be oscillated to assume different angles with respect to the line of draft. The lever 19 has a dog 22 adapted to engage the teeth of the toothed segment 20, and a thumb lever 23 is provided for releasing the dog from the segment. A seat spring 24 is supported by the rear end of the tongue or pole 2 and it in turn supports a seat 25. The bars 18 are for the purpose of bracing or holding the support in a vertical position and retaining the weight boxes 16 over the heads 5. To the matching inner ends of the rods or shafts 4 are attached bumpers 26, see Figs. 1 and 2 and on the outer opposite ends of said shafts are carried collars 27 and nuts 28 which prevent the displacement of the several heads on the shafts 4.

Scrapers 29 are provided, coöperating with the teeth of each head, said scrapers being secured at their upper ends to bars 30, adjustably connected with respect to longitudinal movement to the rear of the weight boxes 16, as shown at Fig. 1. The lower ends of the said scrapers are curved as at 31 and encircle the spools 12 as shown: and the scrapers for the outer heads are placed intermediate the collars 27 and the disks 7 as shown.

It is understood that a complete machine comprises two shafts 4, each carrying a series of heads 5 arranged in the manner specified on said shafts, and that the shafts and heads are coupled in such a manner that any movement imparted to one series by the throwing of the hand lever is correspondingly and simultaneously imparted to the opposite series, except that normally the two series of heads are disposed at opposite angles. When transporting the implement over the roads or to and from a field it is preferable to adjust the shafts 4 at right angles to the line of draft.

In operation, in hard or dry land, the two sections or series of heads are arranged at an angle to each other and to the line of draft by shifting or throwing the hand lever so as to move the inner ends of the shafts 4 rearwardly which will force their outer ends forwardly. In this position each succeeding tooth of each head and of the succeeding heads of each section or series will make its own cut in the ground, and the cut produced by one tooth will not be a continuation of the cut produced by the tooth next in advance thereof. In other words, as the series of teeth of the several heads enter and leave the soil, they will produce a series of parallel short cuts or serrations located diagonally to the line of draft, somewhat in the manner illustrated in the diagrammatic view referred to as Fig. 8.

In wet or loose soil the sections are angled somewhat less than in dry and hard soil, and each tooth will produce a cut as shown in Fig. 9. The reason the sections are angled less for wet soil is, the soil will tear up in greater masses than when the soil is dry and hard. It is not intended to be understood that cuts will be seen in the ground as represented at Figs. 8 and 9, but these views show the action of the teeth upon the ground.

By forming the teeth as if a continuation of the concavity of the disks 7, a tooth will more readily penetrate into the soil, and the latter will be stirred and loosened to a considerable depth without the least tendency to spading action on the part of the teeth whereby the roots of the plants would be cut. The weight of the implement will ordinarily be sufficient to force the teeth into the ground, but if necessary weights may be placed in the boxes 16 to assist in forcing the teeth into the ground.

The heads are rotated as a team draws the implement forward. The teeth of the heads gradually enter the ground and will gradually come out of the ground, and in so doing, the soil is stirred and loosened destroying all weeds and splitting up the alfalfa stools tearing away the dead sprouts from around the roots of the stalks which naturally means a better yield of alfalfa. This thorough treatment of alfalfa makes it possible to continue the alfalfa year after year and saves the expense of plowing up and reseeding, which has been found necessary in many sections after four or five years continuous crops.

As the teeth of the heads in their movement over a field will pick up trash and clods, the scrapers will clean the same as the heads rotate, and discharge said trash and clods to the rear of the said heads.

In using the term tongue it is understood that a stub tongue can be employed to which is connected a truck, without departing from the scope of my invention.

At Fig. 10 I have shown two hand levers for moving the sections and it is immaterial whether one or two hand levers are employed, as I intend my claims to cover both constructions.

I am aware that there have been made "disk harrows" as well as "plowing machines" wherein the disks as well as the rotary-shares have been arranged in two gangs and so coupled that they could be simultaneously thrown at an angle to each other and to the line of draft, except as to such adjustment there is no similarity of construction or operation between those devices and the one herein disclosed, it being a well known fact that in a disk plow or disk harrow the rotary disks turn as well as cut the ground, their action in this respect being similar to that of the moldboard of an ordinary plow obviously therefore the disk-harrow or the plow using rotary plowshares is essentially different from the implement constituting the present invention.

I am further aware of the use of spading-disks or blades similar to those used in cultivators, but so far as I know they are so mounted as to rotate independently about their axial supports and do not sustain the frame-work of the machine, whereas in my improved implement the toothed heads carry the frame, rotate in unison and rotate their shafts. Furthermore the use of a spading-disk or blades in working alfalfa would inevitably cut the roots of the plants, and thus effect serious injury which cannot occur in the operation of my implement. It is also true that blades of the character just described throw the earth away in a furrow, while my only aim is to penetrate the soil to a considerable depth for the purpose of breaking, loosening and disintegrating the same without injuring the roots of the plants.

I am further aware that disk-harrows have been used, wherein each disk had a cutting edge formed with a series of teeth, projecting alternately in opposite directions from the plane of the disk. Such harrows on account of the cutting edges of the disks are wholly unsuited to properly renovate alfalfa, a peculiar type of machine being needed for that purpose, and my present machine having been constructed with especial reference to the conditions of that particular duty.

It has been proposed to use diggers and plows of various types, disks having teeth free to move to a certain extent with relation to the disks, a constructions differing from mine and objectionable for obvious reasons; and it has also been proposed to use scrapers as combinations with rotary diggers, none of the devices of the prior art show the combination of elements herein described and claimed, nor do any of them meet the requirements of the peculiar service to which my implement is adapted, and for which it has been especially devised.

I claim as my invention.

1. An implement of the character described comprising a tongue, two approximately horizontal shafts pivoted with relation to the tongue and adjustable about their pivots, a series of spike-toothed heads, suitably retained in spaced relation on each of said shafts, and in operation adapted to penetrate and loosen the ground, and hand lever means for varying the angular relations of the shafts to the line of draft and holding them in their different positions.

2. An implement of the character described comprising a tongue, two approximately horizontal shafts pivoted with relation to the tongue and adjustable about their pivots, a series of spike-toothed heads suitably retained in spaced relation on each of said shafts to rotate together, all the teeth of each head of the same series being canted in the same general direction relative to the axis of rotation of the head and in operation adapted to penetrate and loosen the ground, and hand lever means for varying the angular relations of the shafts to the line of draft and holding them in their different positions.

3. An implement of the character described, comprising a frame, a tongue attached thereto, a pair of shafts fulcrumed to said frame, a series of spike-toothed heads located on each of said shafts, each head comprising a disk, a ring connected to rotate with the disk and a plurality of suitably spaced teeth held between the disk and ring, and projecting from between the same, spools located on the shafts and each abutting against two adjacent disks to hold the toothed heads in spaced relation, the teeth of the heads adapted in operation to penetrate and loosen the ground, and hand lever means for varying the angles of the shafts with respect to the line of draft, and holding them in their various positions.

In testimony whereof I affix my signature in presence of two witnesses.

JOEL J. HURT.

Witnesses:
J. J. DE JARNETTE,
C. A. WAGNER.